3,188,636
TIME-DEPENDENT HIGH-FREQUENCY INTENSITY CONTROL IN A RADAR RECEIVER
Joan Maarten George Seppen, Hilversum, Netherlands, assignor to North American Philips Company, Inc., New York, N.Y., a corporation of Delaware
Filed Mar. 11, 1963, Ser. No. 264,405
Claims priority, application Netherlands, Apr. 5, 1962, 276,864
3 Claims. (Cl. 343—17.1)

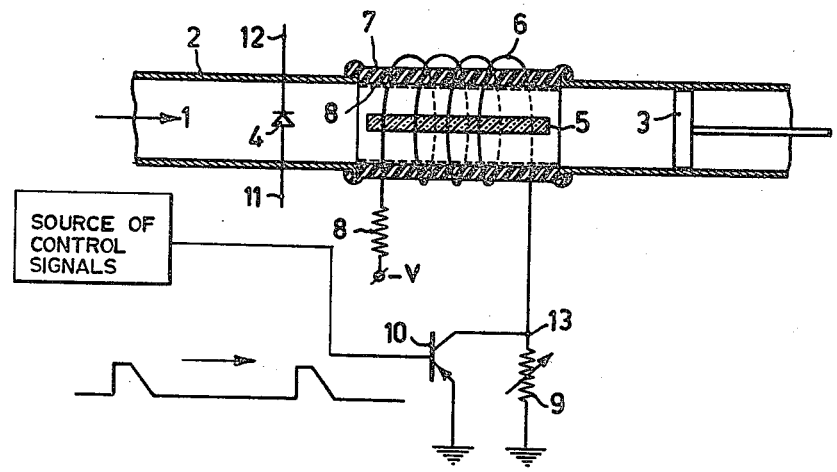

The invention relates to a time-dependent high-frequency intensity control in a radar receiver.

With radar transceivers there is the problem that the very strong transmitter pulses and the echo signals from nearby objects are likely to overmodulate the receiver. It is therefore common practice to employ in the receiver a time-dependent automatic intensity control (STC), which operates so that during each transmitter pulse and immediately thereafter the receiver is insensitive, and the sensitivity increases with time according as the weaker echoes from the farther remote objects are received.

It has been found that in spite of such intensity control, particularly with short-range radar, for example river radar or harbour radar, an overmodulation of the input mixing stage of the receiver may occur, for example, due to the presence of strong rain echo signals.

The invention provides an efficacious and practical solution of said problem.

With the arrangement according to the invention use is made of a known input mixing stage of a receiver, in which incoming echo signals together with the oscillations from a local oscillator are fed to one end of a wave guide. A mixing diode is provided in the waveguide and the other end of the waveguide is shortcircuited for high frequencies, for example by means of piston.

According to the invention a phase shifting device is provided between the mixing diode and the shortcircuited end of the wave guide. The phase shifting member is controlled in synchronism with the transmitter pulses so that during the radar transmitter pulses the effective length between the mixing crystal and the shortcircuited end is equal to an even-numbered multiple of a quarter wavelength of the transmitter pulses in the wave guide. This length is changed subsequently, during the reception of the echo pulses, into an odd-numbered multiple of a quarter wavelength.

The invention will be described more fully with reference to an embodiment shown diagrammatically in the drawing. The drawing shows part of the input mixing stage of a radar receiver. The incoming transmitter pulses, together with the oscillations from a local oscillator, are fed in known manner (not shown) to the left-hand end 1 of a wave guide 2 having a rectangular section. The waveguide is closed at the right-hand end by a piston 3. A mixing crystal 4 is provided in the waveguide 2. A variable phase shifter, which may be of known structure is positioned between the mixing crystal 4 and the piston 3.

In the embodiment shown the phase shifter comprises a rod 5 extending in the longitudinal direction of the wave guide and being made from high-frequency magnetic material, for example ferrite, which can be magnetically prepolarized in an axial direction by means of a variable current passing through a winding 6 around the wave guide. Since the wall of the wave guide acts like a short-circuited turn with respect to the winding 6, which would be traversed by eddy currents which would prevent a rapid variation of the magnetic field inside the wave guide, part of the wall is made from insulating material 7. The insulating material is coated on the inside with a thin metal skin 8. This metal layer, which may have a thickness of e.g. about $5\mu$, screens the wave guide from high-frequency radar waves effectively from the exterior.

The winding 6 is connected on the one hand by way of a resistor 8 to a negative voltage source $-V$ and on the other hand by way of a variable resistor 9 to ground. The resistor 9 is shunted by the emitter-collector path of the transistor 10. The effective electric length of the wave guide between the mixing crystal 4 and the piston 3 depends upon the prepolarization of the ferrite body 5 and hence upon the current passing through the winding 6.

The current passing through the winding 6 is controlled so that during each radar transmitter pulse and immediately thereafter the said electric length is equal to an even-numbered multiple of a quarter wavelength, preferably equal to half the wavelength. The mixing crystal is then located at the area of a node of the electric field for the frequency of the radar waves. Since, moreover, the intermediate frequency of a radar receiver is comparatively low, as a rule, the wavelength of the oscillations from the local oscillator will deviate only slightly from the radar wavelength, so that the mixing crystal will also be located substantially at a node for the local oscillations. The mixing crystal will then supply only a small amount of intermediate-frequency energy at its output terminals 11, 12, which are connected to the intermediate-frequency amplifier. During the period of reception of the echo signals the current passing through the winding 6 has a value such that the effective electric length between the mixing crystal 4 and the piston 3 is equal to an odd-numbered multiple of a quarter wavelength, preferably equal to one quarter wavelength. The mixing crystal is then located at an antinode of the waves and the crystal will supply a high amount of intermediate-frequency energy. The transmission damping is then for example only 0.2 db, whereas during the transmitting period it may amount to 60 db or more. Since the adjustment of the mixing crystal to a node of the electric lines of force is fairly critical (in contrast to the adjustment to an antinode) and since it is not desirable for this adjustment to depend upon the random electric parameters of the transistor, the adjustment is preferably such that during a transmitting period the transistor is blocked.

The final adjustment is then carried out so that, with a conducting transistor 10 (which then constitutes an effective short circuit for the point 13 to earth, whilst the current passing through the winding 6 is very little dependent upon the value of the resistor 9), the piston 3 is first adjusted so that the mixing crystal is located near an antinode of the waves and the transmission is at a maximum. Then the resistor 9 is adjusted so that the transmission is at a minimum when the transistor 9 is cut off.

The control of the transistor 10 is otherwise carried out normally so that during each transmitter pulse a positive pulse is fed to the base electrode. This positive pulse starts just before the transmitter pulse and decreases in a sawtooth-like manner after the transmitter pulse so that the receiver does not reach immediately thereafter the maximum sensitivity and the strong echo signals from nearby objects cannot cause disturbances.

What is claimed is:
1. In a radar receiver of the type wherein echo pulses of high frequency energy are applied to waveguide means having a mixer diode for producing intermediate frequency signals, means for reducing the intensity of high frequency energy applied to said mixer diode during the transmission of radar pulses comprising short circuit means in said waveguide means spaced from said mixer diode, variable phase-shifting means in said wave-guide means between said mixer diode and said short circuit means, and means for controlling the phase-shift of said phase- shifting means in response to the transmisison of said radar pulses whereby the effective distance between said mixer diode and said short circuit means is substantially an even multiple of one quarter the wavelength of the frequency of said radar pulses during said transmission, and said effective distance is substantially an odd multiple of one-quarter the wavelength of said frequency during reception of said echo pulses.

2. The receiver of claim 1, in which said phase-shifting means comprises a rod of ferrite material positioned in said waveguide means between said mixer diode and said short circuit means, winding means surrounding said rod for producing an axial magnetic field therein with respect to said waveguide means, a source of variable current having an amplitude responsive to the occurrence of said radar pulses, and means applying said current to said winding means.

3. In a system for the reception of first pulses of high frequency energy in waveguide means wherein said first pulses are applied to said waveguide means and second pulses of high frequency energy are also applied to said waveguide means at times different than when said first pulses are applied thereto, and wherein a mixer diode is positioned in said waveguide means for producing an intermediate frequency signal, means for isolating said mixer diode from said second pulses comprising short circuiting means in said waveguide means spaced from said mixer diode, variable phase-shift means in said waveguide means between said mixing diode and said short circuiting means, means for controlling the phase-shift of said phase-shift means, a source of control signals responsive to said second pulses, and means applying said control signals to said controlling means for making the effective length between said mixing diode and short circuiting means equal to an even multiple of one-quarter wavelength of the frequency of said high frequency energy during the occurrence of said second pulses, and equal to an odd multiple of one-quarter wavelength of said frequency in the absence of said second pulses.

References Cited by the Examiner
UNITED STATES PATENTS

| | | | |
|---|---|---|---|
| 2,839,683 | 6/58 | Cacheris | 325—24 |
| 2,927,319 | 3/60 | Bradley | 343—17.1 |
| 2,959,778 | 11/60 | Bradley | 343—5 |

CHESTER L. JUSTUS, *Primary Examiner.*